United States Patent
Detwiler et al.

(10) Patent No.: US 8,913,492 B2
(45) Date of Patent: *Dec. 16, 2014

(54) LOAD BALANCING DISTRIBUTION OF DATA TO MULTIPLE RECIPIENTS ON A PEER-TO-PEER NETWORK

(75) Inventors: Stephen C. Detwiler, Oakland, CA (US); James E. Marr, Burlingame, CA (US); Attila Vass, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 89 days.

This patent is subject to a terminal disclaimer.

(21) Appl. No.: 13/560,191

(22) Filed: Jul. 27, 2012

(65) Prior Publication Data

US 2012/0294148 A1 Nov. 22, 2012

Related U.S. Application Data

(63) Continuation of application No. 11/764,680, filed on Jun. 18, 2007, now Pat. No. 8,238,237.

(51) Int. Cl.
*H04L 12/28* (2006.01)
*H04L 29/08* (2006.01)
*G06F 17/30* (2006.01)

(52) U.S. Cl.
CPC ........ *H04L 67/104* (2013.01); *G06F 17/30097* (2013.01); *H04L 67/1008* (2013.01); *H04L 67/1065* (2013.01); *H04L 67/101* (2013.01); *H04L 67/1002* (2013.01); *H04L 67/1019* (2013.01); *H04L 67/1023* (2013.01); *H04L 67/1074* (2013.01)
USPC ............................ 370/230; 370/400; 370/254

(58) Field of Classification Search
USPC ................................ 370/230, 400
See application file for complete search history.

(56) References Cited

U.S. PATENT DOCUMENTS 6,012,096 A 1/2000 Link et al.
6,327,630 B1 12/2001 Carroll et al.
(Continued)

FOREIGN PATENT DOCUMENTS

| EP | 1345359 B1 | 11/2006 |
| JP | 2004005256 A | 1/2004 |
| JP | 2009517921 A | 4/2009 |

OTHER PUBLICATIONS

A. Rowstron et al., "Pastry: Scalable, Decentralized Object Location and Routing for Large-Scale Peer-To-Peer Systems", IFIP/ACM International Conference on Distributed Systems Platforms (Middleware), Heidelberg, Germany, Nov. 2001.

(Continued)

*Primary Examiner* — Dang Ton
*Assistant Examiner* — Pamit Kaur
(74) *Attorney, Agent, or Firm* — Joshua D. Isenberg; JDI Patent

(57) ABSTRACT

Each peer node in a plurality has a different corresponding key value. Each of the nodes can broadcast one or more items to a plurality of recipient nodes. The recipient nodes are arranged into a list according to a key value order. The list is divided into two or more parts of approximately equal size, and each part of the list and the one or more items is forwarded to a recipient peer node corresponding to a first key value in that part of the list. It is emphasized that this abstract is provided to comply with the rules requiring an abstract that will allow a searcher or other reader to quickly ascertain the subject matter of the technical disclosure. This abstract is submitted with the understanding that it will not be used to interpret or limit the scope or meaning of the claims.

17 Claims, 9 Drawing Sheets

(56) References Cited

U.S. PATENT DOCUMENTS

| | | | |
|---|---|---|---|
| 6,487,583 | B1 | 11/2002 | Harvey et al. |
| 6,701,344 | B1 | 3/2004 | Holt et al. |
| 6,829,634 | B1 | 12/2004 | Holt et al. |
| 6,952,401 | B1 | 10/2005 | Kadambi et al. |
| 7,039,701 | B2 | 5/2006 | Wesley |
| 7,130,921 | B2 | 10/2006 | Goodman et al. |
| 7,133,368 | B2 | 11/2006 | Zhang et al. |
| 7,272,636 | B2 | 9/2007 | Pabla |
| 7,340,500 | B2 | 3/2008 | Traversat et al. |
| 7,533,172 | B2 | 5/2009 | Traversat et al. |
| 7,536,467 | B2 | 5/2009 | Guo et al. |
| 7,574,523 | B2 | 8/2009 | Traversat et al. |
| 7,803,052 | B2 | 9/2010 | Multerer et al. |
| 7,917,628 | B2 | 3/2011 | Hesselink et al. |
| 8,238,237 | B2 | 8/2012 | Detwiler et al. |
| 2002/0009084 | A1 | 1/2002 | Kalkunte |
| 2003/0177240 | A1* | 9/2003 | Gulko et al. ............... 709/226 |
| 2004/0054807 | A1* | 3/2004 | Harvey et al. ............... 709/243 |
| 2005/0108203 | A1 | 5/2005 | Tang et al. |
| 2005/0204042 | A1 | 9/2005 | Banerjee et al. |
| 2005/0223102 | A1* | 10/2005 | Zhang et al. ............... 709/228 |
| 2007/0121570 | A1 | 5/2007 | Takeda et al. |

OTHER PUBLICATIONS

Advisory Action dated Dec. 9, 2010 for U.S. Appl. No. 11/764,680.
Final Office Action dated Jul. 7, 2010 for U.S. Appl. No. 11/764,680.
International Search Report and Written Opinion of the International Searching Authority for the International application No. PCT/US08/66998 dated Aug. 6, 2008, 7 pages.
Ion Stoica et al., "Chord: A Scalable Peer-to-peer Lookup Protocol for Internet Applications", IEEE/ACM Transactions on Networking, vol. 11, No. 1, pp. 17-32, Feb. 2003.
Korean Office Action dated Apr. 20, 2011 issued for Korean Patent Application No. 2010-7001140.
Non-Final Office Action dated Dec. 23, 2009 for U.S. Appl. No. 11/764,680.
Non-Final Office Action dated May 28, 2009 for U.S. Appl. No. 11/764,680.
Office Action issued by the Japan Patent Office (JPO) on Jan. 17, 2012 for Japanese patent application No. 2010-513347.
Song Jiang and Xiaodong Zhang "FloodTrail: an Efficient File Search Technique in Unstructured Peer-to-Peer Systems" GLOBECOM Aug. 2003—IEEE Global Telecommunications Conference, pp. 2891-2895, IEEE Operations Center, Piscataway, NJ.
Sony Computer Entertainment Incorporated, "Cell Broadband Engine Architecture", Version 1.0, Aug. 8, 2005.
Yongdae Kim et al. "Simple and Fault-Tolerant Key Agreement for Dynamic Collaborative Groups" Published in: Proceeding CCS '00 Proceedings of the 7th ACM conference on Computer and communications security ACM New York, Ny, USA .Copyrgt.2000, pp. 235-244.
Cholvi V et al: "Efficient Search in Unstructured Peer-to-Peer Networks", European Transactions on Telecomunications, Wiley & Sons, Chichester, GB, vol. 15, No. 6, Nov. 1, 2004, pp. 535-548.
Eng Keong Lua et al: "A Survey and Comparison of Peer-to-Peer Overlay Network Schemes", IEEE Communications Surveys, IEEE, New York, NY, US, vol. 7 No. 2, Apr. 1, 2005, pp. 72-93.
Extended European Search Report Mailed Sep. 6, 2013, 8 pages, for European Patent Application No. 08771090.1.
Godfrey B et al: "Load balancing in dynamic structured p2p systems", INFOCOM 2004, Twenty-Third Annualjoint Conference of the IEEE Computer and Communications Societies, IEEE, Piscataway, NJ, USA col. 4, Mar. 7, 2004, pp. 2253-2262.
Kai-Hsiang Yang et al: "Proof: A DHT-Based Peer-to-Peer Search Engine", Proceedings of the IEEE/WIC/ACM International Conference on Web Intelligence IEEE Comput, IEEE, SOC Los Alamitos, CA, USA, Dec. 1, 2006, pp. 702-708.
Ratnasamy S et al: "A scalable content-addressable network". Computer Communication Review, ACM, New York, NY, US, Oct. 1, 2001, pp. 161-172.

* cited by examiner

LOAD BALANCING DISTRIBUTION OF DATA TO MULTIPLE RECIPIENTS ON A PEER-TO-PEER NETWORK

PRIORITY CLAIM

This application is a continuation of and claims the priority benefit of co-pending U.S. patent application Ser. No. 11/764,680, filed Jun. 18, 2007, the entire contents of which are incorporated herein by reference.

FIELD OF THE INVENTION

The present invention relates to peer-to-peer networks, and more specifically to load balancing the distribution of content over the peer-to-peer network.

BACKGROUND OF THE INVENTION

A decentralized computing environment may be defined by a number of computing systems interconnected to communicate with one another, wherein each computing system can perform both client and server functions. A peer-to-peer (P2P) network represents a decentralized computing environment in which each computing system within the P2P network is defined as a peer of every other computing system within the network. For discussion purposes, each peer computing system within the P2P network is referred to as a node. Additionally, each node within the P2P network may be configured to execute software having substantially equivalent functionality. Therefore, each node may act as both a provider and a user of data and services across the P2P network. Peer to peer networks are distributed data networks without any centralized hierarchy or organization. Peer to peer data networks provide a robust and flexible means of communicating information between large numbers of computers or other information devices, referred to in general as nodes.

A P2P network relies primarily on the computing power and bandwidth of the participants in the network rather than concentrating it in a relatively low number of servers. P2P networks are typically used for connecting nodes via largely ad hoc connections. Such networks are useful for many purposes. P2P networks may be used, e.g., for sharing content files containing audio, video, data or anything in digital format is very common, and real-time data, such as telephony traffic, may also be transmitted using P2P technology.

An overlay network is a logical or virtual network organization that is imposed on nodes connected by one or more types of underlying physical network connections. In an overlay network, nodes are connected by virtual or logical links, each of which can correspond with one or more paths in an underlying physical network. Overlay network are typically implemented in hardware and/or software operating in the application layer or other top-level layer of an OSI network stack or other type of networking protocol.

One class of peer to peer overlay networks are referred to as distributed hash table networks. Distributed hash table overlay networks use a hash function to generate and assign one or more key values to a unique node. The set of all possible key values is referred to as a hash space. Nodes are organized in the hash space according to their assigned key values. The hash function is selected so that nodes are approximately evenly distributed throughout the hash space. Distributed hash table overlay networks are typically highly scalable, often supporting millions of nodes; robust, allowing nodes to join or leave frequently; and efficient, routing a message to a single destination node quickly.

There are numerous different types of distributed hash table overlay networks. One type of peer to peer overlay network is known as a Chord network. The Chord overlay network protocol is described in detail in "Chord: A Scalable Peer-to-peer Lookup Protocol for Internet Applications", Ion Stoica, Robert Morris, David Liben-Nowell, David R. Karger, M. Frans Kaashoek, Frank Dabek, Hari Balakrishnan, *IEEE/ACM Transactions on Networking*, Vol. 11, No. 1, pp. 17-32, February 2003, which is incorporated herein by reference. Another type of distributed hash table overlay network is Pastry, which is described in "Pastry: Scalable, distributed object location and routing for large-scale peer-to-peer systems," A. Rowstron and P. Druschel. *IFIP/ACM International Conference on Distributed Systems Platforms (Middleware)*, Heidelberg, Germany, pages 329-350, November, 2001, which is incorporated herein by reference.

A Chord overlay network may exhibit logarithmic properties arising from "asymptotic complexity" of messaging. For example, if there are N nodes in a Chord ring and a first node wants to send a message to a second node, the first node typically has to communication with some subset of the N nodes in order to locate node B. In a Chord overlay network, the first node generally has to communicate with a very small subset of all N nodes, specifically $\log_2$ N. This property allows a Chord overlay network to have relatively fast messaging, even for a very large number N of nodes. However, a Chord overlay network can only guarantee this $\log_2$ N messaging property if the IDs of the nodes are completely randomly distributed around the Chord ring.

Current state of the art Chord overlay networks often rely on an even, random distribution of the node IDs in distributed hash tables to provide load balanced routing of queries and messages in a peer to peer network. However, even if node IDs are evenly and randomly distributed clustering of recipients of a message or query within the global address space of the P2P network may lead to bottlenecks. For example, when a peer tries to route the same message to multiple peer nodes, some intermediate nodes may become overloaded as they route messages if those nodes are responsible for the address space of the recipients.

It is within this context that embodiments of the present invention arise.

BRIEF DESCRIPTION OF THE DRAWINGS

Embodiments of the present invention may be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Embodiments of the invention address problems with load balancing search for or distribution of a file or block of data to multiple recipients on a peer-to-peer network, particularly where the recipients are not uniformly distributed within the global address space.

Figure 1:
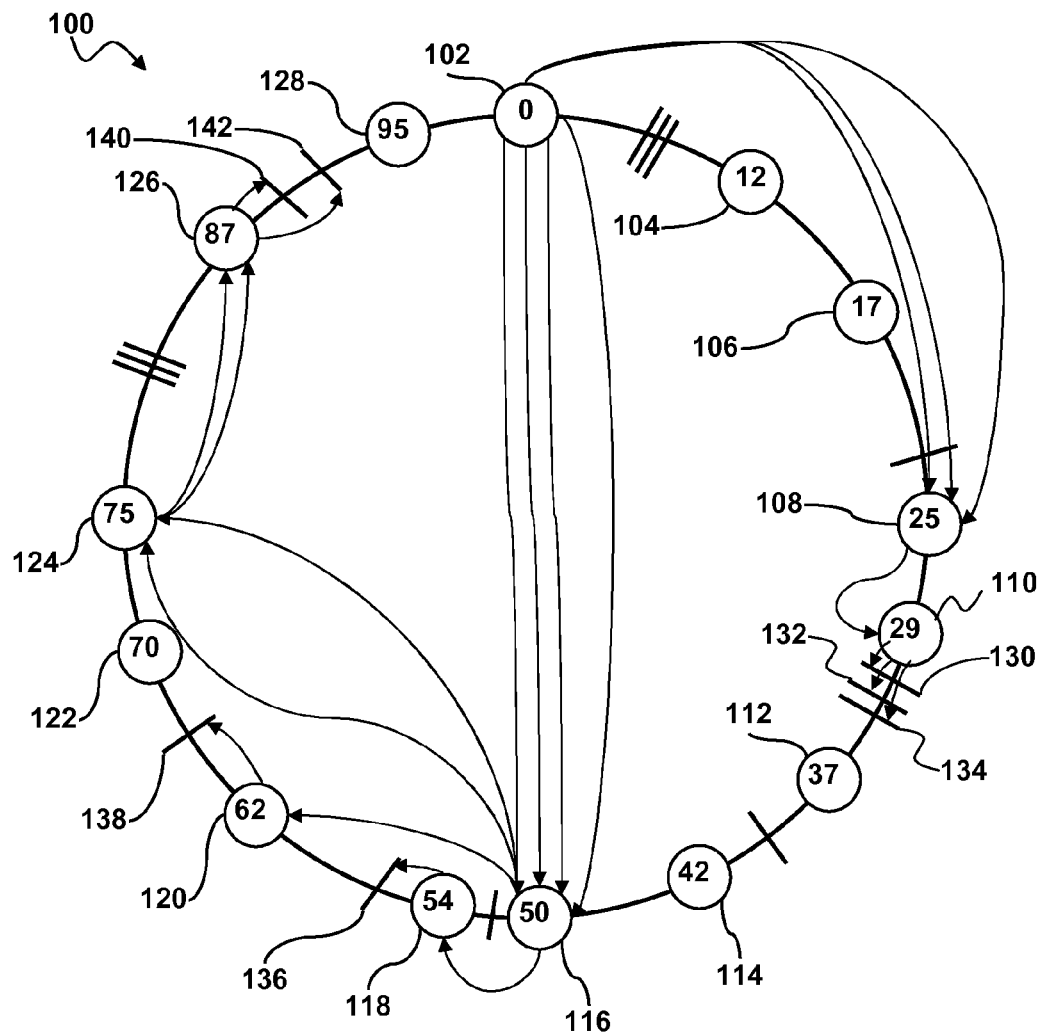
FIG. 1 illustrates an example chord overlay network suitable for use with embodiments of the invention.

To appreciate the advantages embodiments of the present invention it is useful to understand a conventional Chord search. In a typical P2P implementation, a large number of peers connected to the Internet are organized into a ring to form a peer-to-peer network 100 as shown in FIG. 1. In this example, the network 100 includes peer nodes 102, 104, 106, 108, 110, 112, 114, 116, 118, 120, 122, 124, 126, and 128. Not all nodes connected to the network 100 are shown for the sake of simplicity. Each peer node is assigned a unique identifier referred to as a key. These identifiers may be evenly and randomly distributed. However, this is not a strict requirement for all embodiments of the present invention. For the purposes of example, the assignment of keys to peer nodes in network 100 is as shown in Table I below:

TABLE I

| NODE | KEY |
|---|---|
| 102 | 0 |
| 104 | 12 |
| 106 | 17 |
| 108 | 25 |
| 110 | 29 |
| 112 | 37 |
| 114 | 42 |
| 116 | 50 |
| 118 | 54 |
| 120 | 62 |
| 122 | 70 |
| 124 | 75 |
| 126 | 87 |
| 128 | 95 |

In addition each shared file (represented by diagonal lines) on the network 100 is also assigned a unique key. When a new peer or file is added to the circle or new information about a peer is generated that information is published to a hash table as a hash number generated according to some hash function. Thus, the hash table may be regarded as a database in which each database entry has a hash number. The hash numbers are chosen from an identifier (ID) space that covers a sufficiently large range of numbers that two entries are extremely unlikely to be hashed to the same identifier number. For example, the well-known SHA-1 hash function has 160 bits, which may represent $(2^8)^{20}$ different numbers. Peers randomly choose an identifier from the ID space and organize themselves into the circle. Each published object in the hash table is a pointer back to a particular peer that has that object. The hash table is said to be distributed in the sense that each of the peer nodes in the network 100 is responsible for keeping track of a different range of keys that make up the hash table.

When a peer joins the hash table, it is assigned responsibility for a particular range of keys in the ID space of the hash table. Each peer maintains a finger table stored in memory that provides a fast lookup into the ring. The topology of the nodes in the overlay network may be dynamic. Nodes can join or leave the overlay network at any time. When a node departs the overlay network 100, the links between the departing node and any related nodes should be updated. In general, the update should change links to the departing node in other nodes' finger tables or other node references to valid nodes. Additionally, new links should be established to nodes previously linked to by the departing node's finger table or other node references. Joining nodes should be added to other nodes' finger tables. Additionally, finger tables or other links should be established for the joining nodes. Example protocols for handling nodes joining or leaving the overlay network are discussed in detail in the above-cited references.

Generally, each peer node in the network 100 needs to be able to communicate directly with every node in its finger table. This may be implemented by a persistent connection, but it is not required. Persistent connections are an optimization that most Chord implementations choose to use, but are not fundamentally necessary for operation of a Chord network. Nodes in the network 100 may have direct communication available with any other nodes. Typically, connectivity to non-finger table nodes may be implemented with some sort of fixed size cache. For example, a node might keep connections open to K non-finger table nodes. Again, this is merely an optimization that can be used to avoid performing a Chord lookup using the finger table.

A particular node may locate files or other information stored at other nodes by using a peer-to-peer search technique referred to as a Chord lookup protocol. Chord allows a distributed set of participants to agree on a single node as a rendezvous point for a given key, without any central coordination. In particular, it provides a distributed evaluation of the successor(ID) function: given the identifier of a key ID, the successor function returns the address of the node whose identifier most closely follows ID in a circular identifier space. The identifier space is typically a 160-bit number. The Chord algorithm handles adjusting this mapping as the population of nodes changes over time. To find any key using a Chord search in a peer to peer network of N nodes a peer typically has to communicate with $\log_2 N$ nodes. If N=300 million nodes, a peer typically has to communicate with about 28 nodes to find any key or peer on the network.

In P2P networks it is desirable to distribute the communication load for looking up each peer or file identifier. In a Chord search a node requesting a file looks up in its own finger table to determine which key corresponding to a node is closest to the key corresponding to a file. For example, referring again to FIG. 1, suppose node 102 is searching for the file corresponding to key 30, and node 102's finger table contains information about nodes with keys 50, 25, 17, 9, 4, 2 and 1. Specifically, node 102 may have information in its finger table about which data keys each of the nodes corresponding to keys 50, 25, 17, 9, 4, 2 and 1 is responsible for. In a conventional Chord search, node 102 would look up in its finger table and determine that node 108 with key 25 is closest to key 30. Node 102 would send a request for key 30 to node 108. If node 108 is responsible for key 30, it would send the corresponding file back to node 102. If node 108 is not responsible for key 30, it would look up in its finger table to determine which node is likely to be responsible for key 30. This process repeats until the node responsible for key 30 is found. At that point, the node responsible for key 30 may send the corresponding file to node 102.

If node 102 is looking for a group of files the Chord search described above may be repeated for each file. For example, suppose node 102 wants find files 130, 132, 134, 136, 138, 140, and 142 corresponding to keys 30, 32, 33, 55, 66, 89 and 93. From the previous example, node 102's finger table contains information about the nodes that are assigned keys 50, 25, 17, 9, 4, 2 and 1. Using an unmodified Chord search, node 102 would end up querying node 108 about keys 30, 32 and 33 and querying node 116 (corresponding to key 50) about keys 55, 66, 89 and 93. Suppose node 108 determines from its finger table that the node corresponding to key 29 (node 110) is responsible for keys 30, 32 and 33. Node 108 would send a request for these files to node 110. In the meantime node 116 would look up in its finger table to determine which node was responsible for keys 55, 66, 89 and 93. For example, suppose node 118 is responsible for key 55, while node 120 is responsible for key 66, and node 126 is responsible for keys 89 and 93. In this case, the searches for keys 55, 67, 89 and 93 take the same path for almost all of these files. Specifically, all four requests would pass through node 116 and the requests for keys 89 and 93 would pass through nodes 116 and 124 and 126. This would tend to overload the nodes on these paths, particularly nodes 116 and 124. Note particularly the multiple requests (indicated by arrows) from node 102 to nodes 108 and 116.

Figure 2:
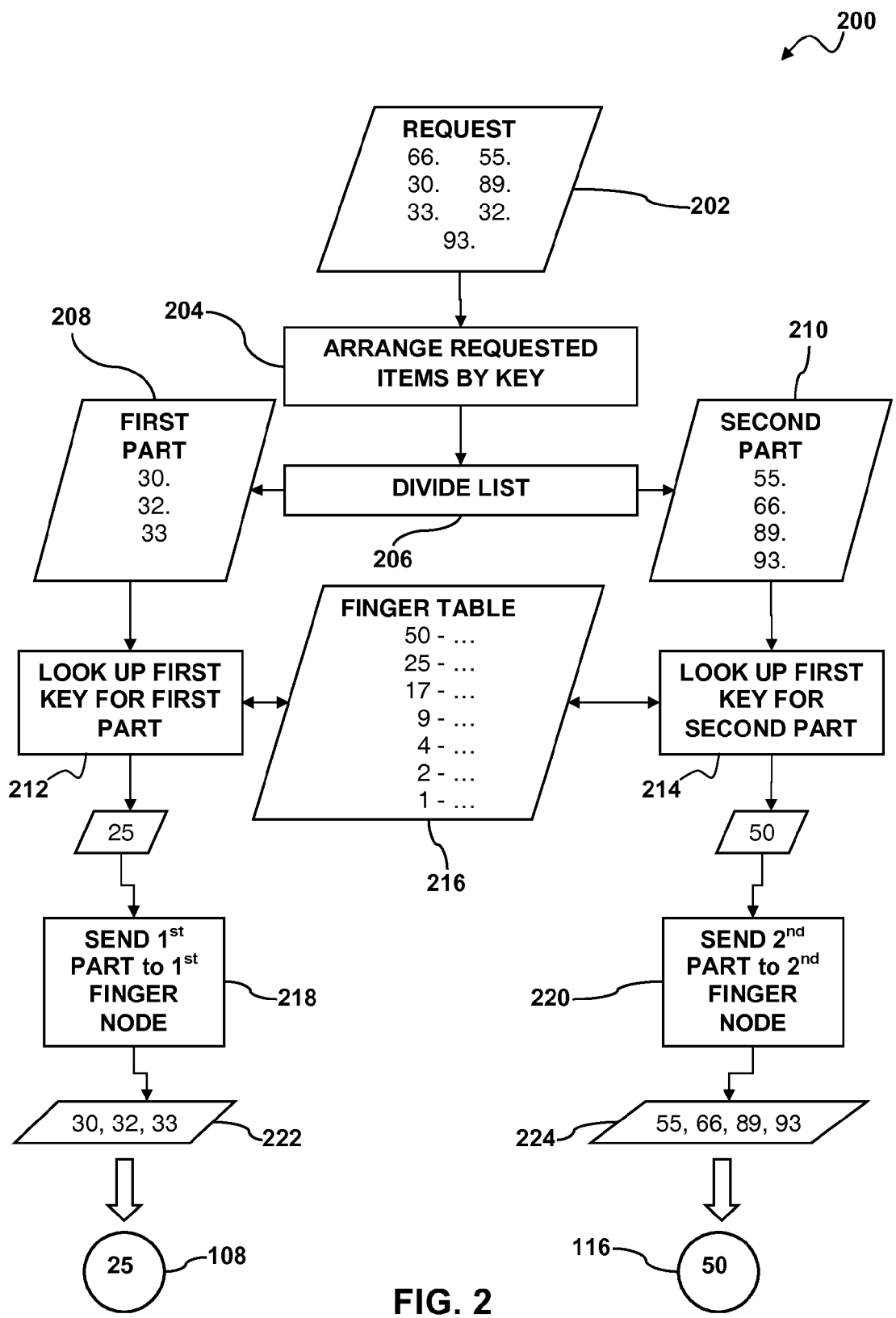
FIG. 2 is a flow diagram illustrating a search method for a chord overlay according to an embodiment of the present invention.
Figure 3:
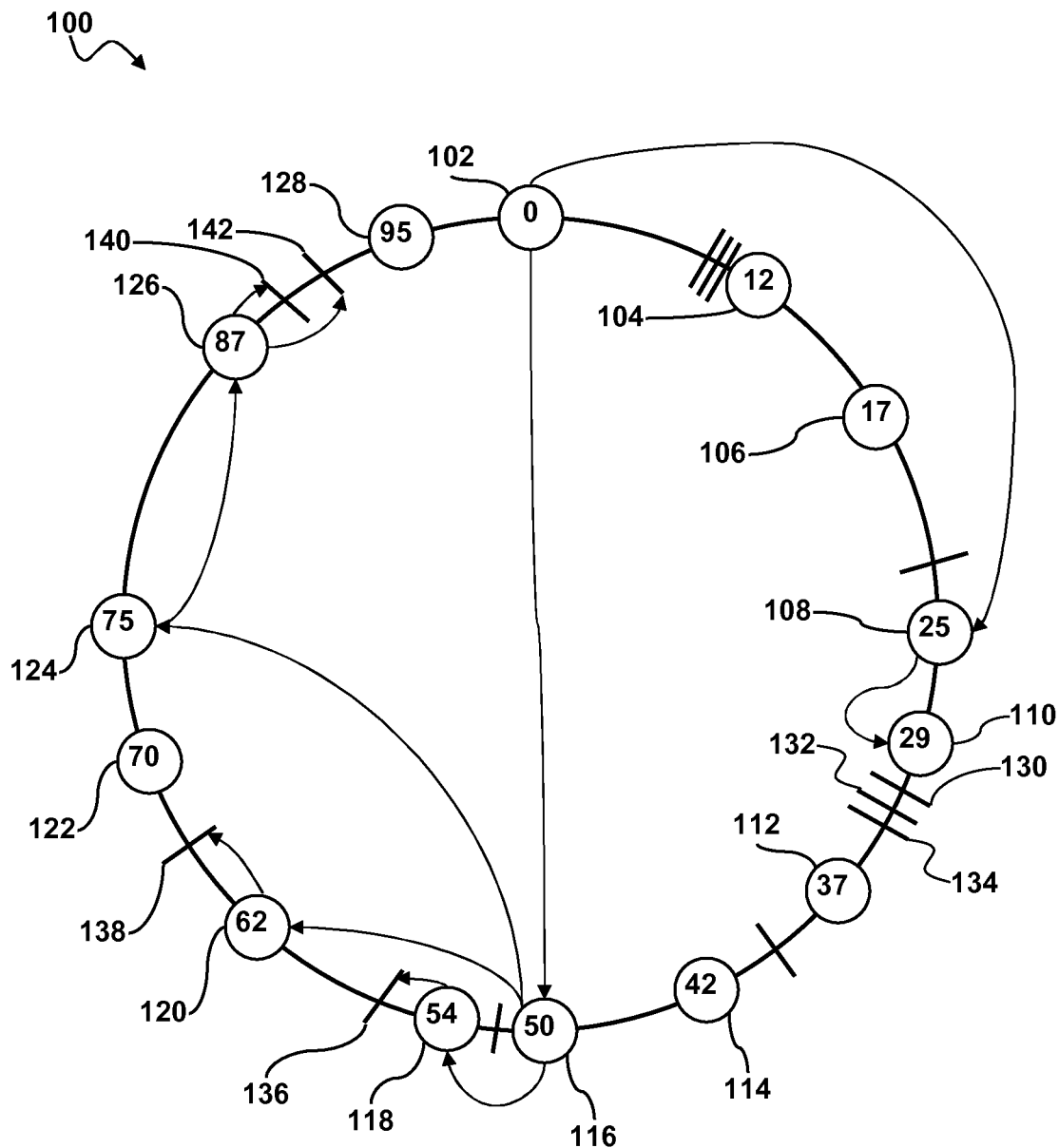
FIG. 3 illustrates an example of a chord overlay network implementing a search according to an embodiment of the present invention.

According to embodiments of the present invention, to balance the load for the above-described search, node 102 may order a list of requested files according to key, split the list into two or more parts and send requests for the files in each part to a node corresponding to the first key in the corresponding part of the list. This embodiment may be understood by referring to the flow chart in FIG. 2 and the diagram shown in FIG. 3. FIG. 2 illustrates a method 200 for an improved chord search according to an embodiment of the present invention. As indicated at 202 a node in a chord overlay network may receive or initiate a request for files. As in the above example, node 102 may initiate or receive a request for files 130, 132, 134, 136, 138, 140 and 142 corresponding to keys 30, 32, 33, 55, 67, 80 and 93. The list may be arranged in order according to key value, as indicated at 204 and divided into two or more parts, as indicated at 206. By way of example, the request 202 may be divided such that, keys 30, 32 and 33 are in a first part 208 and files 55, 67, 80 and 93 are in a second part 210. Lookups 212, 214 may then be performed in a finger table 216 to determine which node keys are closest to the first key in each part. The nodes corresponding to these keys are referred to herein as the finger nodes for each part of the list. For example, at 212 node 102 may perform a lookup in finger table 216 for the node key closest to key 30 and, at 214, node 102 may perform a lookup for the node key closest to key 55. In this example, node key 25 (corresponding to node 108) is closest to key 30 and node key 50 (corresponding to node 116 is closest to key 55. Thus, node 108 is the finger node for the first part 208 and node 116 is the finger node for the second part of the list.

Once the finger nodes have been determined for each part of the list, requests for the files in the parts of the list are sent at 218, 220 to the corresponding finger nodes. Specifically, at 218, node 102 may forward a request 222 to node 108 to perform a lookup for keys 30, 32 and 33. Similarly, at 220, node 102 may forward a request 224 to node 116 to perform a lookup for keys 30, 32 and 33.

Each node in the network 100 may be configured, e.g., by appropriate programming, to implement the method 200. As a result, the process described above with respect to FIG. 2 may be repeated at each finger node. For example, node 108 may have a finger table organized such that it has information regarding the assignment of keys to nodes with keys 75, 50, 42, 34, 29, 27 and 26. Node 108 may determine from this finger table which other node(s) is/are closest to files 30, 32 and 33. In this example, the closest node to both 30 and 32 is key 29, which corresponds to node 110. If node 102 has sent node 108 a request for a relatively large number of keys, node 108 may a) split the request it received from node 102 into two or more parts and repeat the procedure described above with respect to FIG. 2. Alternatively, if the number of requested keys is relatively small, node 108 may b) figure out which node is responsible for the remaining keys in the request. By way of example, node 108 may be configured to always perform action a. Action b could be considered an optimization. As such, many factors may be taken into account when deciding to perform action b. Possible factors are the number of nodes left in the list, pre-existing communication channel to a node or if the node is known to have high bandwidth to some or all of the listed nodes. For example, if there is a small number of remaining nodes (e.g., 4 or less), it may be more efficient for node 108 to message them directly. Alternatively, if a recipient is in node 108's finger table, it may choose to send a direct message to that recipient, while using action a for the rest of the list). Furthermore, information regarding bandwidth to particular nodes could be gathered and remembered from previous interactions with other nodes, using some sort of cache.

As used herein, the term bandwidth refers to a rate of data transmission over a network (e.g., in bits per second or message packets per second) as determined by, among other things, network throughput and network latency. Network throughput refers to a rate of data transfer while data transmission is ongoing and network latency refers to a period of delay occurring before or data transmission commences. In general terms, increasing network throughput tends to increase bandwidth and increasing network latency tends to decrease bandwidth.

In this example, node 108 may determine that node 110 is responsible for keys 30, 32 and 33 and send node 110 a request for the files corresponding to keys 30, 32 and 33. Node 110 may then send the results (files 130, 132 and 134) either directly to node 102 or back to node 108, which may relay the results back to node 102. In certain embodiments, a requesting node's address may be embedded in its queries and in all queries sent on its behalf by other nodes so that the answers to these queries are sent directly back to the node initiating the request.

For the second part 210 of the request 202, node 116 may have a finger table containing information about assignment of keys to nodes having node keys 75, 67, 59, 54, 52 and 51. Node 116 may determine from this finger table that node key 54 (corresponding to node 118) is closest to key 55. Node 116 may then contact node 118 with a request for keys 55 and 66. By way of example, node 118 may be responsible for key 55, but not key 66. Node 118 may look up in its own finger table and determine that the node with key 62 (node 120 in this example) is responsible for key 66 (corresponding to file 138). Node 118 may then return the file 138 to node, 116, node 108 or node 102 and forward a request for key 66 to node 120. In the meantime, node 116 may send a request to the node having 124 (which is assigned key 75) for keys 89 and 93. Node 124 may then and forward the request for keys 89 and 93 to node 126 which may return files 140 and 142. Note that, in contrast to the conventional chord search described with respect to FIG. 1, the Chord search depicted in FIG. 3 distributes the search load more evenly. In particular, as may be seen in FIG. 3, there is considerably less traffic between node 102 and node 108 and between node 102 and node 116.

Further optimizations can be made to the Chord search described above. For example, at 204 a node may split a request into more than two parts. Although the preceding example, describes splitting the request into two parts, there may be conditions where splitting the request into more than two parts may be advantageous. For example an application implementing a chord search may be configured to cluster recipients in a way that takes advantage of specific high bandwidth connections. It should be understood, therefore, that splitting the request into two groups is not the only possible implementation within the scope of embodiments of the present invention.

Furthermore, a node may be configured to monitor network bandwidth available to the members of its finger table so that the parts of a request may be preferentially forwarded to nodes having more available resources. By way of example, bandwidth could be measured when a node is first added to the finger table. Although it is generally difficult to determine instantaneous available bandwidth, general link capabilities may be determined fairly readily. For example, the difference between a 28.8 baud modem and a T1 connection is very easy to determine. Another important network performance metric is latency, which could also be measured when adding a node to the finger table. For the purposes of embodiments of the present invention, coarse grain knowledge is sufficient to perform these types of decisions. For example, a node may choose to act differently if it knows a destination node has a broadband connection. By claiming more responsibility for message delivery, nodes with fewer resources can continue to perform in a responsive manner.

It is noted that a modified Chord search as described above is particularly advantageous compared to a conventional Chord search if there are more than two items in the request. The two techniques are more or less identical if there are one or two items in the request. However, if there are three or more items, this new technique is advantageous. The node wishing to send the message only has to contact 2 nodes using the technique described above where a single split was performed, instead of all 3, as would be the case in a conventional Chord search.

Figure 4:
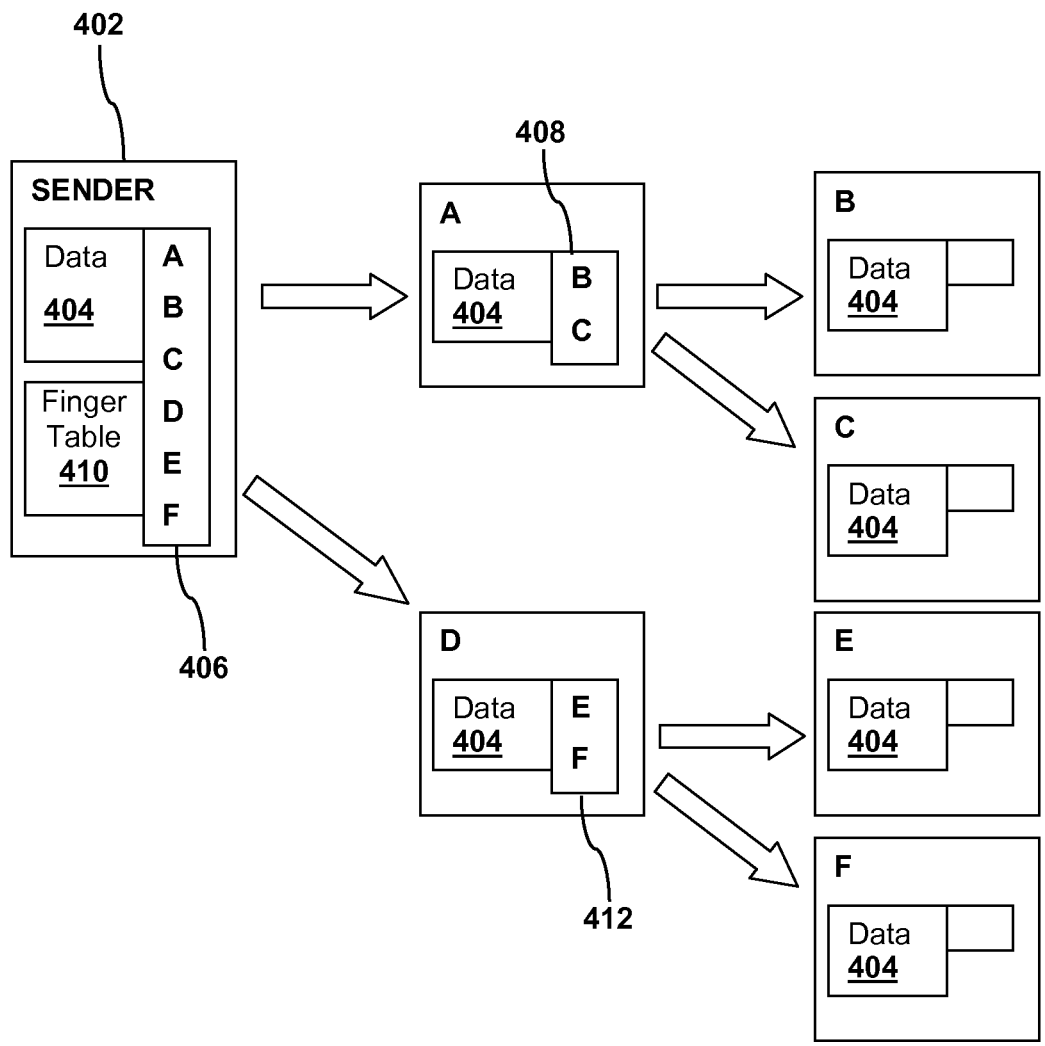
FIG. 4 illustrates an example of data distribution in a peer-to-peer network according to an embodiment of the present invention.

According to embodiments of the present invention, the Chord search described above with respect to FIG. 2 and FIG. 3 may be adapted to implement broadcasting data from a peer node to a plurality of other peer nodes. To reduce overloading intermediate nodes, an original sender 402 of broadcast data 404 may divide a list 406 of recipients for the data 404 into two or more parts as shown in FIG. 4. The sender 402 may be a peer in a peer-to-peer network of the type described above. The list 406 may be arranged in order of key values corresponding to the recipients. Each part of the list 406 may be sent along with the data 404 to a peer node corresponding to a first key in that part of the list. By way of example, the list 406 may be divided into a first part 408 and a second part 412. The data 404 may be sent along with the first part 408 of the recipient list 406 to a first finger node A chosen from the sender's finger table 410. If, for example, it is determined that the list 406 is to be split into two parts, the first finger node A may be the member of the sender's finger table that is responsible for the address space containing most of the recipients on the list 406. The second part 412 of the list 406 may be sent with the data 404 to a second finger node D chosen from the sender's finger table 410, e.g., using a procedure similar to that described above for the chord search method 200. By way of example, the second finger node D may be a predecessor of the first finger node A. Because of the $\log_2 N$ distribution of the distributed hash table, the predecessor can be expected to know the location of many of the recipients as well and will be highly likely to be able to deliver the message without further routing. Recipient nodes D and A may then deliver the message to any node with which they have a direct peer-to-peer connection and the process may be repeated for any remaining entries in the list 406. Specifically, first finger node A may send the data 404 to nodes B, C while second finger node D forwards the data 404 to nodes E, F. In some embodiments the recipient nodes may be selected such that those with more available resources take on a greater portion of the load of broadcasting the files.

Figure 5:
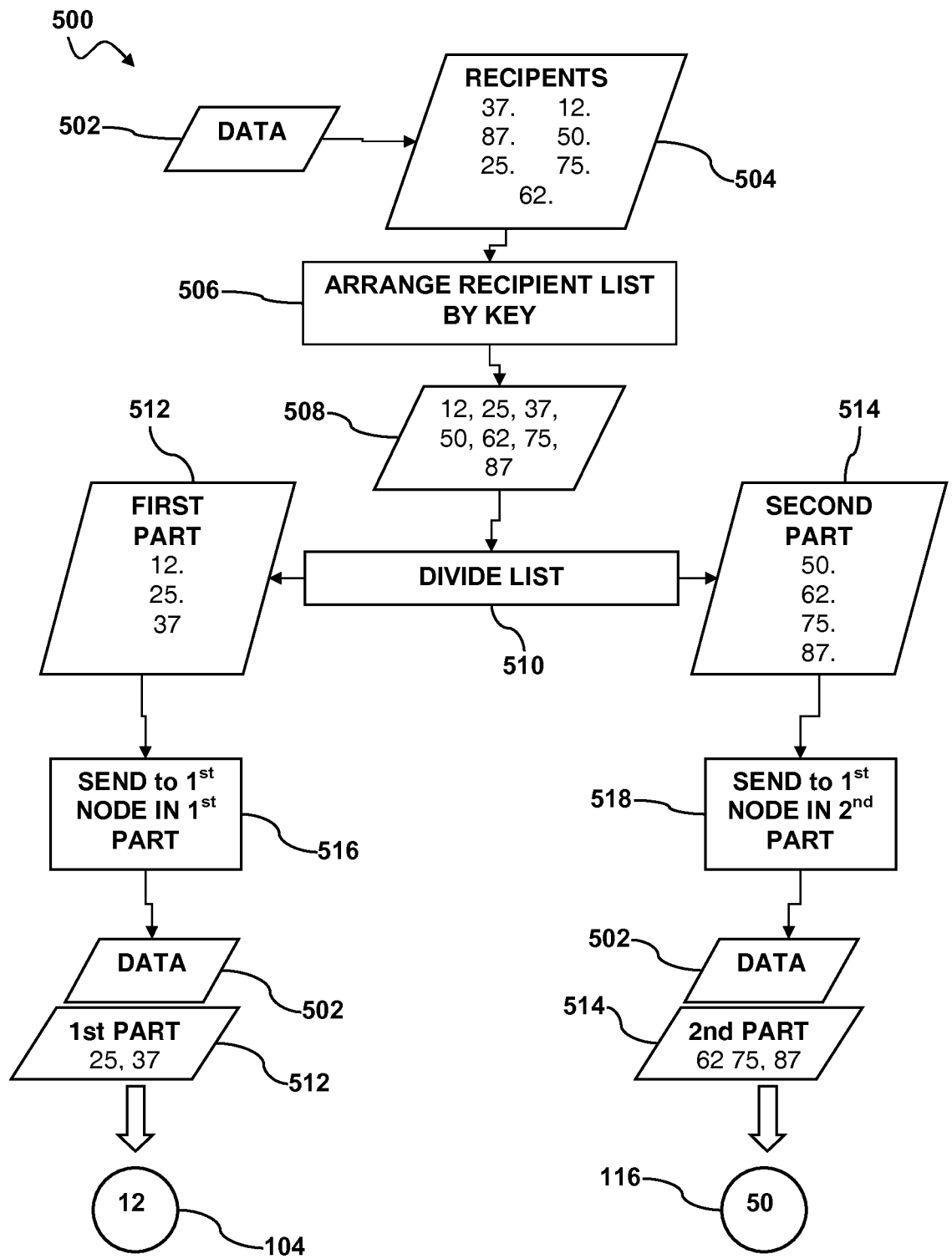
FIG. 5 is a flow diagram illustrating a file distribution method according to an embodiment of the present invention.
Figure 6:
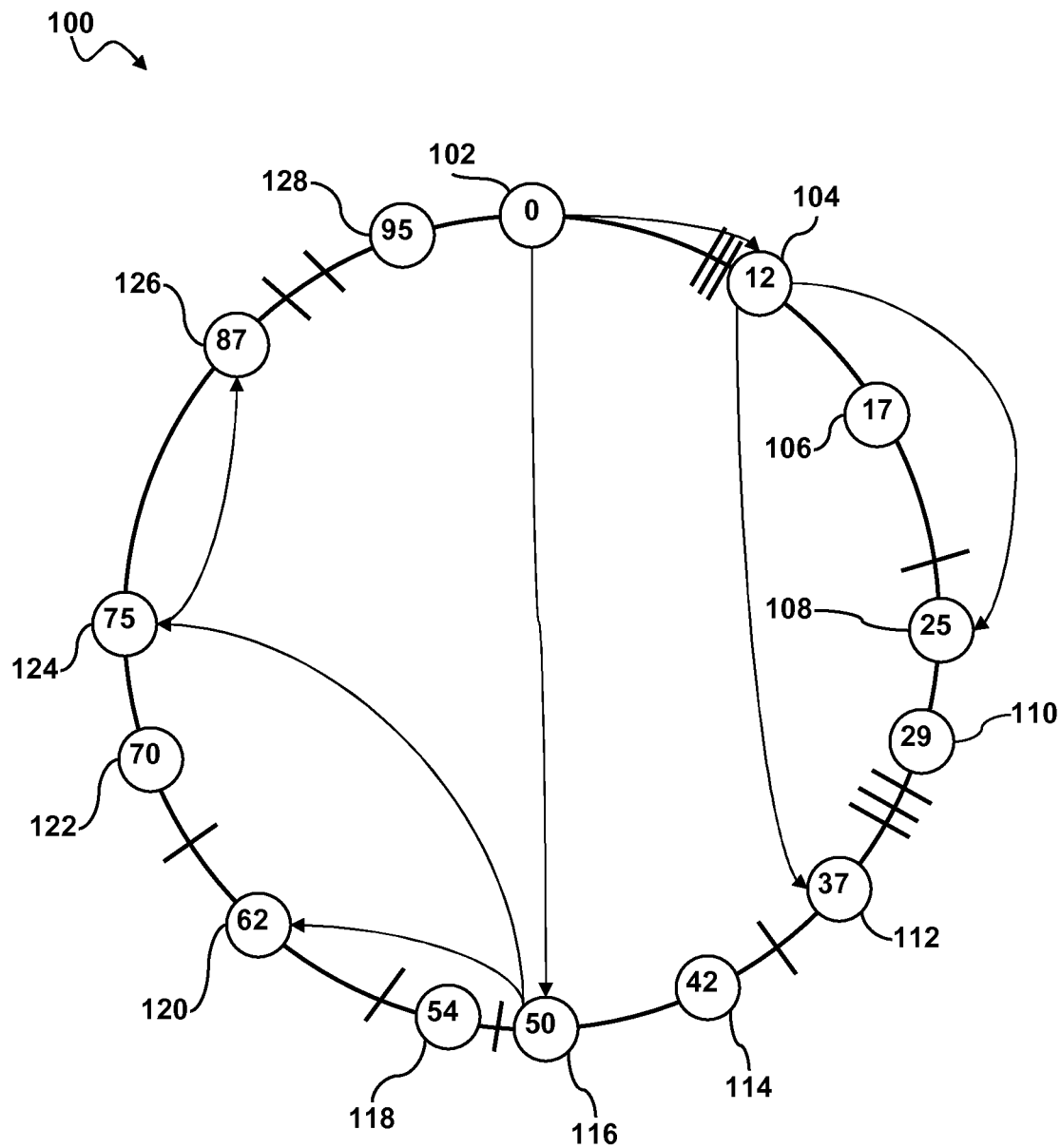
FIG. 6 illustrates an example of file distribution in a chord overlay network according to an embodiment of the present invention.

FIGS. 5 and 6 illustrate an example of implementation of a data broadcast method 500 on the overlay network 100 described above. As seen in FIG. 5 and FIG. 6 node 102 on the network 100 may originate or receive a data file 502 and a list of recipients 504. In this example, the recipient list includes keys 12, 25, 37, 50, 62, 75, and 87, corresponding to nodes 104, 108, 112, 116, 120, 124 and 126. The recipient list 504 may be arranged by key as indicated at 506 thereby producing a key-ordered list 508. At 510 the list may be divided into two or more parts, e.g., a first part 512 and a second part 514. In this example, the first part 512 contains keys 12, 25 and 37 and the second part 514 contains keys 50, 62, 75 and 87. In this example, the first key in each list may be used to select the first and second finger nodes. For example, the first part 512 and the data 502 may be sent at 516 to node 104 (corresponding to key 12). Similarly, the second part 514 and the data 502 may be sent at 518 to node 116 (corresponding to key 50).

The method 500 may be repeated at nodes 104 and 116. Specifically, node 104 may split the first part 512 in two and forward the data 502 to nodes 108 and 114. Similarly, node 116 may forward the data 502 to nodes 120 and 124. Node 116 may also send the remaining part of the list 504 (key 87) to node 124. Node 124 may then forward the data 502 to node 126. Note that in this example, no node has to send the data 502 to more than two other nodes. In a more general case where the list 508 is split into K parts, where K≥2, no node has to send the data to more than K nodes.

As may be seen from the foregoing, in certain embodiments of the present invention a node sending a broadcast message need not be overly burdened with sending a message to many peers. In a traditional Chord implementation, by contrast, the sender would individually send the message to each recipient. Using the broadcast technique described herein, the sender only transmits a limited number K of messages, regardless of the number of intended recipients. If the list 508 is divided into K=2 parts, the sender only needs to transmit the message to two different recipients in the overlay network. The entire overlay network cooperates to deliver the message to the entire list of recipients. This levels the playing field, allowing nodes that do not have high amounts of network resources to perform more equally with the other peers participating in the overlay network.

Figure 7:
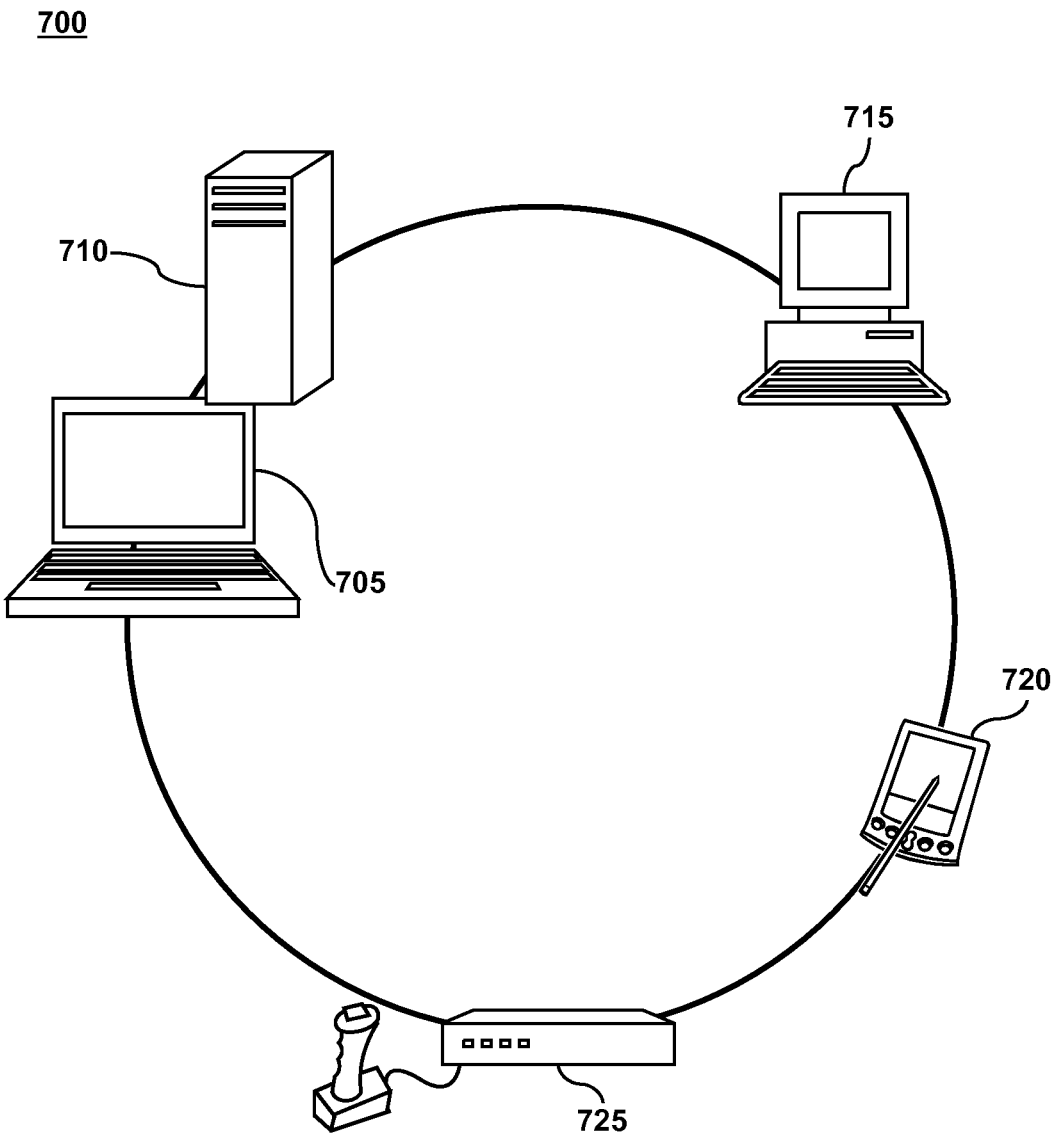
FIG. 7 illustrates a set of information processing devices suitable for implementing an overlay network according to an embodiment of the invention.

FIG. 7 illustrates a set of information processing devices suitable for implementing an overlay network 700 according to an embodiment of the invention. The nodes of overlay network 700 may include laptop or portable computers 705; server computers 710; desktop computers and workstations 715; mobile computing devices 720 such as mobile phones, personal digital assistants, portable digital media players, and portable or handheld game consoles; and home entertainment devices 725 such as video game consoles, digital media players, set-top boxes, media center computers and storage devices. The overlay network 700 can include any number of each type of device independent of the number of devices of other types. Each device may implement the functionality of one or more nodes of the overlay network 700. For each device, the functionality of one or more nodes may be implemented in hardware, software, firmware, or any combination thereof. Node functionality in software may be a part of an application, a library, an application programming interface, and/or an operating system. Furthermore, each node of the overlay network 700 may be connected with other nodes via any type of wired or wireless network connection, incorporating any type of electrical, optical, radio, or other communications means. The overlay network 700 may encompass both local-area networks and wide-area networks, such as the Internet.

In a further embodiment, some devices of the overlay network 700 may have restricted capabilities. For example, only a limited subset of nodes of the overlay network 700 may be allowed to initiate broadcast messages. The remaining nodes may only be permitted to forward and/or process broadcast message. In still a further embodiment, all or a subset of the nodes of the overlay network 700 are capable of authenticating broadcast messages. Such a configuration may be implemented to prevent the spread of unauthorized broadcast messages. Upon receiving a broadcast message, a node first determines whether the broadcast message is authentic, for example by checking a cryptographic signature. If the broadcast message is authentic, it is processed and potentially forwarded to other nodes as described above. Otherwise, the broadcast message may be ignored.

Figure 8:
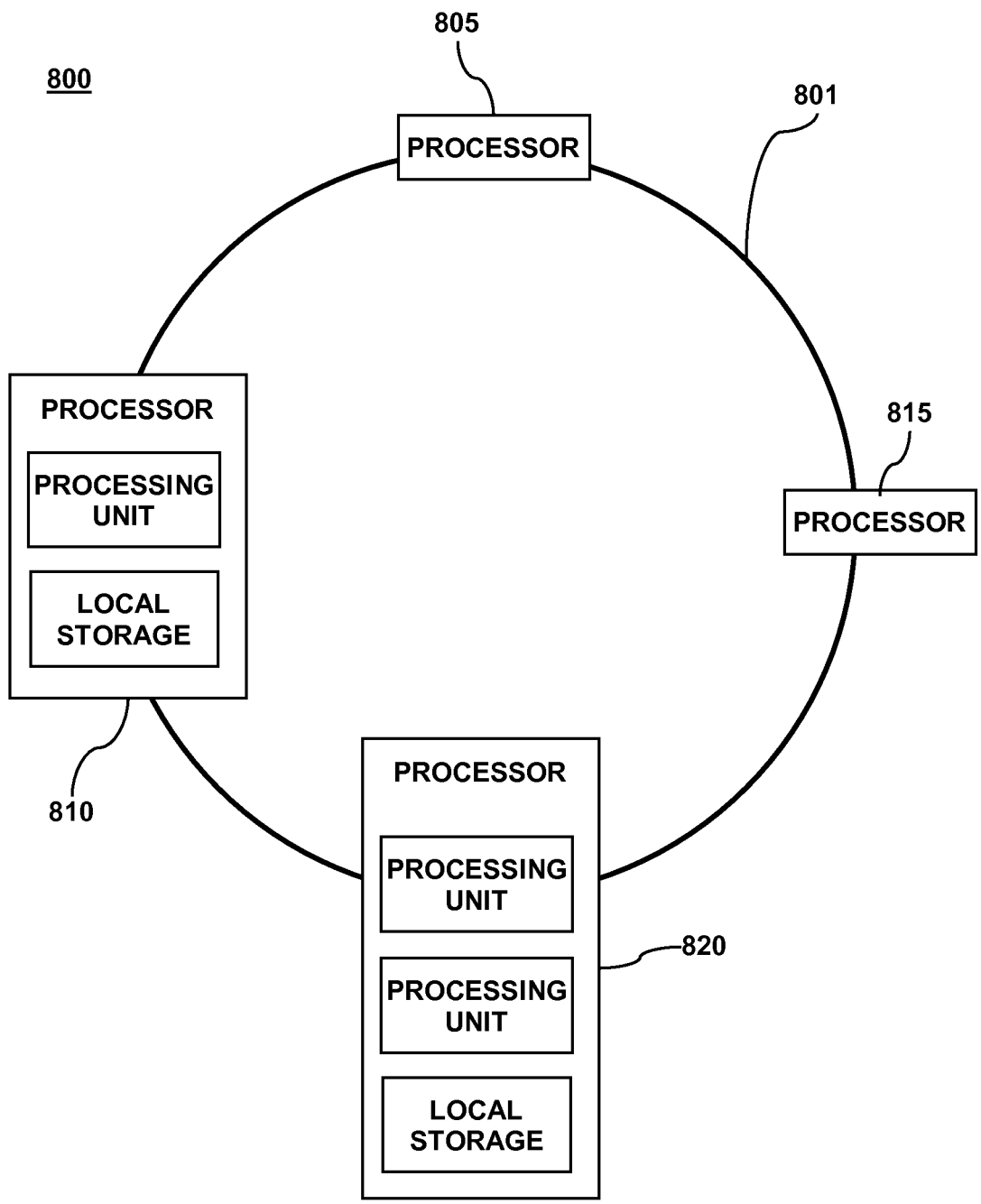
FIG. 8 illustrates a set of information processing devices suitable for implementing an overlay network according to an embodiment of the invention.

FIG. 8 illustrates a set of information processing devices suitable for implementing an overlay network 800 according to an embodiment of the invention. The overlay network 800 enables processors connected over a data bus 801 to send and receive broadcast messages in an efficient manner. The data bus 801 may use any electrical, optical, or other type of data communication means capable of carrying data within and/or between integrated circuits.

The overlay network 800 typically includes a plurality of processors 805, 810, 815, and 820. In further embodiments, overlay network 800 may include thousands or millions of processors. Each processor may be a microprocessor, microcontroller, system on a chip processor, digital signal processor, application specific integrated circuit (ASIC), programmable logic device and/or any other type of information processing device. Each processor may further include one or more processing units capable of independently executing sequences of information processing instructions or processing information according to a fixed algorithm. Each processor may include local data storage as well as access to common or shared data storage.

Figure 9:
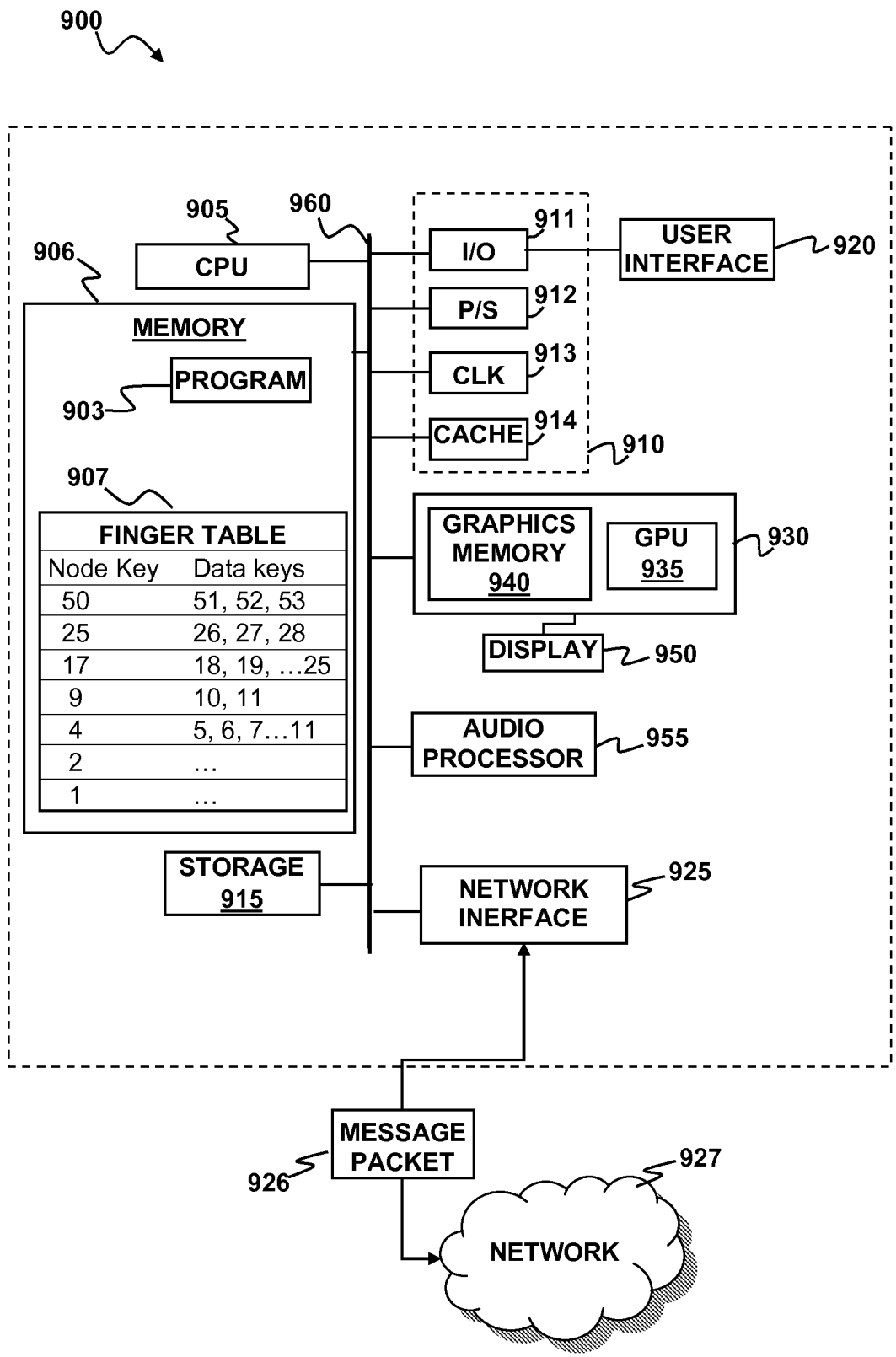
FIG. 9 illustrates the components of an information processing device suitable for implementing a node of an overlay network according to an embodiment of the invention.

FIG. 9 is a block diagram illustrating the components of an information processing device suitable for implementing a peer node of an overlay network according to an embodiment of the present invention. By way of example, and without loss of generality, the information processing device may be implemented as a computer system 900, such as a personal computer, video game console, personal digital assistant, or other digital device, suitable for practicing an embodiment of the invention. The computer system 900 may include a central processing unit (CPU) 905 configured to run software applications and optionally an operating system. The CPU 905 may include one or more processing cores. By way of example and without limitation, the CPU 905 may be a parallel processor module, such as a Cell Processor. An example of a Cell Processor architecture is described in detail, e.g., in *Cell Broadband Engine Architecture*, copyright International Business Machines Corporation, Sony Computer Entertainment Incorporated, Toshiba Corporation Aug. 8, 2005 a copy of which may be downloaded at http://cell.scei.co.jp/, the entire contents of which are incorporated herein by reference.

A memory 906 is coupled to the CPU 905. The memory 906 may store applications and data for use by the CPU 905. The memory 906 may be in the form of an integrated circuit, e.g., RAM, DRAM, ROM, and the like). A computer program 903 may be stored in the memory 906 in the form of instructions that can be executed on the processor 905. The instructions of the program 903 may be configured to implement, amongst other things, a Chord search method, e.g., as described above with respect to FIG. 2 and/or a broadcast method, e.g., as described above with respect to FIG. 5. The computing system 900 may also include well-known support functions 910, such as input/output (I/O) elements 911, power supplies (P/S) 912, a clock (CLK) 913 and cache 914. The system 900 may further include a storage device 915 that provides non-volatile storage for applications and data. By way of example, the storage device 915 may be a fixed disk drive, removable disk drive, flash memory device, tape drive, CD-ROM, DVD-ROM, Blu-ray, HD-DVD, UMD, or other optical storage devices.

The memory 906 may also contain a finger table 907. The finger table contains information regarding the keys for which the node 900 is responsible. These keys include data keys associated with data, e.g., shared files that may be stored in the storage 915. In addition, the finger table 907 may include node keys associated with other peer nodes. Such nodes may include a subset of the nodes in the network 100 that the peer node 900 may be able to contact directly via peer-to-peen connection. The data keys may be arranged into key groups, with each key group being associated with a different node key.

One or more user input devices 920 may be used to communicate user inputs from one or more users to the computer system 900. By way of example, one or more of the user input devices 920 may be coupled to the system 900 via the I/O elements 911. Examples of suitable input device 920 include keyboards, mice, joysticks, touch pads, touch screens, light pens, still or video cameras, and/or microphones. A network interface 925 allows the computer system 900 to communicate with other computer systems via an electronic communications network 927. The network interface 925 may include wired or wireless communication over local area networks and wide area networks such as the Internet. The system 900 may send and receive data and/or requests for files via one or more message packets 926 over the network 927.

The computer system 900 may further comprise a graphics subsystem 930, which may include a graphics processing unit (GPU) 935 and graphics memory 940. The graphics memory 940 may include a display memory (e.g., a frame buffer) used for storing pixel data for each pixel of an output image. The graphics memory 940 may be integrated in the same device as the GPU 935, connected as a separate device with GPU 935, and/or implemented within the memory 906. Pixel data may be provided to the graphics memory 940 directly from the CPU 905. Alternatively, the CPU 905 may provide the GPU 935 with data and/or instructions defining the desired output images, from which the GPU 935 may generate the pixel data of one or more output images. The data and/or instructions defining the desired output images may be stored in memory 910 and/or graphics memory 940. In an embodiment, the GPU 935 may be configured (e.g., by suitable programming or hardware configuration) with 3D rendering capabilities for generating pixel data for output images from instructions and data defining the geometry, lighting, shading, texturing, motion, and/or camera parameters for a scene. The GPU 935 may further include one or more programmable execution units capable of executing shader programs.

The graphics subsystem 930 may periodically output pixel data for an image from graphics memory 940 to be displayed on a display device 950. The display device 950 may be any device capable of displaying visual information in response to a signal from the computer system 900, including CRT, LCD, plasma, and OLED displays. The computer system 900 may provide the display device 950 with an analog or digital signal. By way of example, the display 950 may include a cathode ray tube (CRT) or flat panel screen that displays text, numerals, graphical symbols or images. In addition, the display 950 may include one or more audio speakers that produce audible or otherwise detectable sounds. To facilitate generation of such sounds, the system 900 may further include an audio processor 955 adapted to generate analog or digital audio output from instructions and/or data provided by the CPU 905, memory 906, and/or storage 915.

The components of the computer system 900, including the CPU 905, memory 906, support functions 910, data storage 915, user input devices 920, network interface 925, and audio processor 955 may be operably connected to each other via one or more data buses 960. These components may be implemented in hardware, software or firmware or some combination of two or more of these.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. In the claims that follow, the expressions first and second are used to distinguish between different elements and do not imply any particular order or sequence. The appended claims are not to be interpreted as including means-plus-function limitations, unless such a limitation is explicitly recited in a given claim using the phrase "means for."

What is claimed is:

1. A peer-to-peer network, comprising: a plurality of peer nodes, wherein each peer node is configured to communicate with one or more other ones of said peer nodes over the peer-to-peer network, wherein the peer-to-peer network is an overlay network, wherein each peer node in the plurality has a different corresponding key value, wherein each of the one or more peer nodes is operable to broadcast one or more items to a plurality of recipient nodes of the plurality of peer nodes by
arranging the plurality of recipient nodes into a list according to a key value order,
dividing the list into two or more parts of approximately equal size, and forwarding each part of the list and the one or more items to a recipient peer node corresponding to a first key value in that part of the list, wherein dividing the list into two or more parts of approximately equal size, and forwarding each part of the list and the one or more items to a peer node corresponding to a first key value in that part of the list avoids overloading intermediate nodes in routing messages in the peer-to-peer network.

2. The peer-to-peer network of claim 1 wherein each peer node is configured to communicate directly with a select subset of other peer nodes in the plurality, wherein each node in the select subset for a given node is associated with a key value stored in a finger table on the given node.

3. The peer-to-peer network of claim 1 wherein the peer nodes are organized according to a distributed hash table.

4. The peer-to-peer network of claim 3 wherein the distributed hash table is characterized by an even random distribution.

5. The peer-to-peer network of claim 1 wherein the plurality of peer nodes includes one or more devices selected from the group of laptop or portable computers; server computers; desktop computers and workstations; mobile computing devices, mobile phones, personal digital assistants, portable digital media players, and portable or handheld game consoles; home entertainment devices, video game consoles, digital media players, set-top boxes, media center computers and storage devices.

6. A peer node, comprising: a processor; a network interface operable to couple the peer node to a network; and a memory operable to store program instructions and a finger table, wherein the program instructions are executable by the processor to:
communicate with one or more peer nodes on a peer-to-peer network, wherein the peer-to-peer network is an overlay network, wherein each peer node in the plurality has a different corresponding key value; wherein the peer node is operable to broadcast one or more items to a plurality of recipient nodes of the plurality of peer nodes by:
arranging the plurality of peer nodes into a list according to a key value order
dividing the list into two or more parts of approximately equal size, and
forwarding each part of the list and the one or more items to a peer node corresponding to a first key in that part of the list, wherein dividing the list into two or more parts of approximately equal size, and forwarding each part of the list and the one or more items to a peer node corresponding to a first key value in that part of the list avoids overloading intermediate nodes in routing messages in the peer-to-peer network.

7. The peer node of claim 6 wherein the processor is a multi-core processor.

8. The peer node of claim 6 wherein the processor is a cell processor.

9. The peer node of claim 6 wherein the processor, memory and network interface are components of a laptop or portable computer; server computer; desktop computer or workstations; mobile computing device, mobile phone, personal digital assistant, portable digital media player, and portable or handheld game console; home entertainment device, video game console, digital media players, set-top boxes, media center computers or storage device.

10. The peer node of claim 6, wherein the finger table includes a plurality of node keys associated with a subset of nodes in a peer-to-peer overlay network.

11. The peer node of claim 10, wherein the finger table includes a plurality of data keys, divided into a plurality of data key groups wherein each key group is associated with a corresponding node key.

12. In a peer-to-peer overlay network a method for broadcasting one or more items of data to a plurality of recipient peer nodes selected from a plurality of peer nodes organized in a peer-to-peer overlay network wherein each peer node is associated with a different corresponding key value, the method comprising:

arranging the plurality of recipient peer nodes into a list according to a key value order;

dividing the list into two or more parts of approximately equal size; and forwarding each part of the list and the one or more items to a recipient peer node corresponding to a first key in that part of the list, wherein dividing the list into two or more parts of approximately equal size, and forwarding each part of the list and the one or more items to a peer node corresponding to a first key value in that part of the list avoids overloading intermediate nodes in routine messages in the peer-to-peer network.

13. The method of claim 12, further comprising determining an amount of bandwidth available for one or more nodes in the plurality of nodes.

14. The method of claim 13, wherein forwarding each part of the list includes preferentially selecting the first key in at least one of the two or more parts according to an amount of bandwidth available for the node corresponding to the first key.

15. The method of claim 14 wherein the first key is a member of a finger table that corresponds to a node that is responsible for an address space containing most of the peers in the plurality.

16. The method of claim 15 wherein the peer node corresponding to the first key for one part of the list corresponds to a predecessor of the peer node corresponding to the first key for another part of the list.

17. A non-transitory computer-accessible storage medium comprising program instructions, wherein the program instructions are computer-executable on a peer node to implement a method for broadcasting one or more items of data to a plurality of recipient peer nodes selected from a plurality of peer nodes organized in a peer-to-peer overlay network wherein each peer node is associated with a different corresponding key value, the method comprising:

arranging a plurality of recipient peer nodes into a list according to a key value order;

dividing the list into two or more parts of approximately equal size; and forwarding each part of the list and the one or more items to a recipient peer node corresponding to a first key in that part of the list, wherein dividing the list into two or more parts of approximately equal size, and forwarding each part of the list and the one or more items to a peer node corresponding to a first key value in that part of the list avoids overloading intermediate nodes in routine messages in the peer-to-peer network.

\* \* \* \* \*